United States Patent
Willis et al.

(10) Patent No.: US 9,844,925 B2
(45) Date of Patent: Dec. 19, 2017

(54) PHOTORESIST FILM WITH ADHESIVE LAYER AND MICROSPHERES

(71) Applicant: Rayzist Photomask, Inc., Vista, CA (US)

(72) Inventors: Randy Willis, Vista, CA (US); Josh Willis, Vista, CA (US)

(*) Notice: Subject to any disclaimer, the term of this patent is extended or adjusted under 35 U.S.C. 154(b) by 86 days.

(21) Appl. No.: 13/975,581

(22) Filed: Aug. 26, 2013

(65) Prior Publication Data
US 2015/0056414 A1    Feb. 26, 2015

(51) Int. Cl.
*B32B 27/00*    (2006.01)
*C09J 7/02*    (2006.01)
*C08K 7/22*    (2006.01)
*C09D 1/00*    (2006.01)

(52) U.S. Cl.
CPC ............ *B32B 27/00* (2013.01); *C09J 7/0296* (2013.01); *C03C 2218/34* (2013.01); *C08K 7/22* (2013.01); *C09D 1/00* (2013.01); *C09J 2201/606* (2013.01); *C09J 2205/106* (2013.01); *C09J 2205/11* (2013.01); *C09J 2431/00* (2013.01); *Y10T 156/10* (2015.01); *Y10T 428/24496* (2015.01); *Y10T 428/24612* (2015.01)

(58) Field of Classification Search
None
See application file for complete search history.

(56) References Cited

U.S. PATENT DOCUMENTS

| | | | |
|---|---|---|---|
| 4,430,416 A * | 2/1984 | Goto et al. | 430/263 |
| 4,764,449 A * | 8/1988 | VanIseghem | 430/162 |
| 5,670,250 A * | 9/1997 | Sanville et al. | 428/323 |
| 2010/0166619 A1 * | 7/2010 | Dietz | 422/179 |
| 2011/0076430 A1 | 3/2011 | Shigematsu | |
| 2012/0242011 A1 * | 9/2012 | Landry-Coltrain | B41N 3/006 264/480 |

* cited by examiner

Primary Examiner — Laura Powers

(57) ABSTRACT

The present invention provides, in at least one embodiment, a film and method for engraving objects. The film includes an adhesive layer configured to allow the film to be easily repositionable on the surface of an object. For example, the film can be shifted, rotated, or moved prior to pressure being applied and before the engraving. Additionally, the photoresist layer includes microspheres comprising small pockets of air which strengthen the photoresist layer by bouncing the engraving blast away and allow the photoresist layer to advantageously be designed thinner.

11 Claims, 3 Drawing Sheets

PHOTORESIST FILM WITH ADHESIVE LAYER AND MICROSPHERES

BACKGROUND OF THE INVENTION

1. Field of Invention

The invention relates generally to a photoresist film for engraving, and more particularly, to easily repositioning the film prior to pressure being applied and before the engraving.

2. Description of Related Art

Engraving is the practice of incising a design into a hard, usually, but not limited to flat surface, by cutting grooves into it. Common surfaces to engrave include glass, wood, stone or any other hard surface that will abrade away.

Traditional engraving continues to be practiced today by goldsmiths, glass engravers, monument makers, gunsmiths and others, while modern industrial techniques such as laser engraving have many important applications as well. Laser engraving is the practice of using a laser to engrave or mark an object, and it does not use tools which contact the engraving surface and it does not wear out.

Engraving applies a photoresist to the surface to be engraved to create a mask that shields some areas during a subsequent operation which engraves, dissolves, or otherwise removes some or all of the material from the unshielded areas. The photoresist is material used in several industrial processes such as photolithography and engraving to form a patterned coating on a surface.

In engraving, a photoresist is selected which is resistant to the particular engraving compound to be used. It may be a liquid applied by brushing, spraying, pouring or other means and then allowed to set, or it may come in sheet form and be applied by laminating. The surface of the object is then sandblasted through a pattern or a design cutout portion on the photoresist.

A problem with conventional photoresist films is the difficulty repositioning the film to a surface of an object such that the design can be observed on the object, and such that the precise arrangement can be confirmed, prior to adhesion. Once a conventional film is applied to the surface, it cannot be moved to a different part of the surface.

Another problem with conventional photoresist films is achieving a thin width but without weakening the film. There is a tradeoff between the thickness of the film and the strength. A thicker film is desirably stronger than a thinner material due to its composition. And a stronger film allows for a deeper engraving into an object or surface producing sharper images and a higher resolution. However, a thicker film unfortunately does not allow as many details to be engraved into an object, compared to a thinner film. Ideally, a strong film is desired to ensure the film blocks the areas which should not be engraved, but the film is thin enough to make engraving details easier.

U.S. Pat. No. 4,764,449 to Vanlseghem provides a method of forming an engraved pattern in the surface of a complex contour on an object such as a wine goblet. Vanlseghem has a photoresist laminate comprising a resist layer, a support membrane, and an adhesive layer, which are exposed with an ultraviolet light to leave a desired pattern. However, Vanlseghem's adhesive is like that of many conventional engraves, where the film's adhesive has a high degree of tack and cohesive strength. Vanlseghem's adhesive tends to bond almost instantaneously to a surface with slight contact pressure at the interface between the adhesive and the contacted surface. Since Vanlseghem's adhesive has a high degree of tack, it cannot be easily shifted, rotated, moved, or otherwise repositioned prior to applying pressure.

U.S. Pat. Pub. No. 2011/0076430 to Shigematsu contains a pressure-sensitive adhesive sheet having a base material and a pressure-sensitive adhesive layer, where the pressure-sensitive adhesive layer contains bubbles and hollow microspheres. However, Shigematsu is unrelated and not relevant to photoresist films, and instead is for a heat pack or body warmer, which is unrelated to engraving.

SUMMARY OF THE INVENTION

The present invention provides, in at least one embodiment, a film and method for engraving objects. The film includes an adhesive layer configured to allow the film to be easily repositionable on the surface of an object. For example, the film can be shifted, rotated, or moved prior to pressure being applied and before engraving. Additionally, the photoresist layer includes microspheres comprising small pockets of air which strengthen the photoresist layer by bouncing the engraving blast away and allowing the photoresist layer to advantageously be designed thinner.

In one embodiment, a film comprises: an adhesive layer configured to be attached to a substrate or an object, wherein the adhesive layer is configured to allow repositioning on the object prior to applying pressure to the adhesive layer and prior to engraving and the adhesive layer is configured to remain fixed to an object after applying pressure to the adhesive layer and during engraving, wherein the adhesive layer comprises a pressure sensitive adhesive; a membrane layer attached to the adhesive layer; and a photoresist layer attached to the membrane layer, the photoresist layer having a design cutout portion and a non-cutout portion, wherein the non-cutout portion resists the engraving. The photoresist layer may comprise microspheres and the microspheres may comprise pockets of air and may be configured to make the film stronger. The film may further comprise a top coat layer attached to the photoresist layer. The photoresist layer may comprise a film. The adhesive layer may comprise polyvinyl acetate. The substrate may comprise a silicon layer.

In another embodiment, a method comprises the steps of: attaching an adhesive layer to a substrate or an object, wherein the adhesive layer is configured to allow repositioning on the object prior to applying pressure to the adhesive layer and prior to engraving and the adhesive layer is configured to remain fixed to an object after applying pressure to the adhesive layer and during engraving, wherein the adhesive layer comprises a pressure sensitive adhesive; attaching a membrane layer to the adhesive layer; and attaching a photoresist layer to the membrane layer, the photoresist layer having a design cutout portion and a non-cutout portion, wherein the non-cutout portion resists the engraving. The photoresist layer may comprise microspheres and the microspheres may comprise pockets of air and may be configured to make the film stronger. The method may further comprise a top coat layer attached to the photoresist layer. The photoresist layer may comprise a film. The adhesive layer may comprise polyvinyl acetate. The substrate may comprise a silicon layer.

An advantage of the present invention is that the film is very easy to remove and reattach to in a different location on the object prior to pressure being applied, yet after pressure is applied, the attachment is strong enough to not move during the engraving process. This repositionable feature is accomplished through a unique adhesive layer.

Another advantage of the present invention is that the film sticks very well, and thus is configured to attach to a broad range of surfaces given the repositionable nature of the film, which one might expect only attached to polished surfaces such as glass, and not other surfaces such as rocks, flagstone, etc.

A further advantage of the present invention is that the film is very strong and thus can be manufactured thinner without risking the engraving process cutting through the non-design portions of the film. A thinner film allows more details to be engraved in the object. This strong yet thin feature is accomplished through microspheres, which are air bubbles, in the photoresist layer.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, and the advantages thereof, reference is now made to the ensuing descriptions taken in connection with the accompanying drawings briefly described as follows.

DETAILED DESCRIPTION OF EMBODIMENTS

Figure 1:
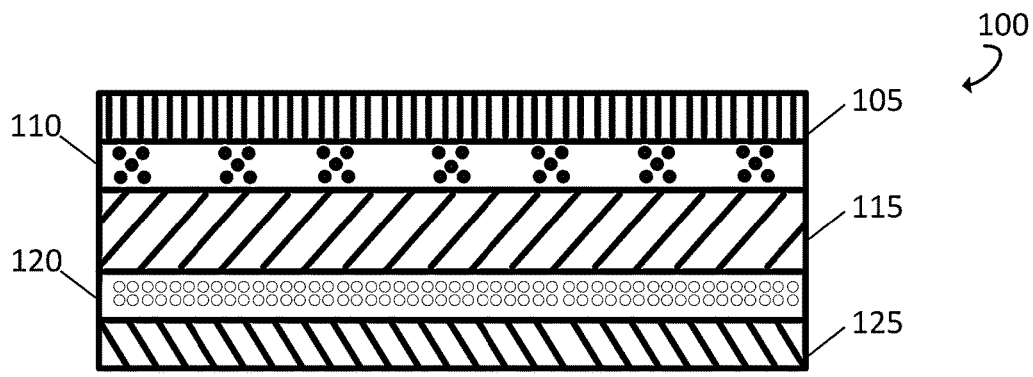
FIG. 1 illustrates a side view of a five layer photoresist film according to an embodiment of the invention.

Further features and advantages of the invention, as well as the structure and operation of various embodiments of the invention, are described in detail below with reference to the accompanying FIGS. 1-5, wherein like reference numerals refer to like elements.

Although the invention is at times described in the context of a particular object, such as glass, one of ordinary skill in the art readily appreciates that the present invention can be implemented with other engraving surfaces. Additionally, although the invention is described as a five layer film, one of ordinary skill in the art readily appreciates that the present invention can be implemented with more or less layers without departing from the spirit of the invention. For example, it is common for a film to have more than one film/photoresist layer.

For the purposes of the present application, the term and process of "engraving" is used to represent similar processes, and as such is defined to include at least the processes of engraving, sandblasting, etching, frosting, and sand carving.

The present invention provides, in at least one embodiment, a new photo-resist film. The film, also referred to as a mask, resist, a photomask, a photo-resist, or a engrave-resist, is used to produce engraved images into a glass, wood, stone Corian, or any other abradable surface of an object. The film uses a new material not currently found in conventional photoresist films. This new material is different because it comprises an adhesive layer that allows for repositioning art work by a user prior to pressure being applied, but the adhesive is a very aggressive once pressure is applied. Once applied, the adhesive holds the film down and the film does not move during the engraving process.

In one embodiment, the adhesive layer is a pressure sensitive adhesive that is applied in a thickness range from 4 to 10 microns. The adhesive layer is what sticks the masks (also known as a stencil) to the object which will be engraved. The adhesive layer is coated thin enough to enable a clean and proper engraving to be accomplished therethrough, yet strong enough to hold the design in place during engraving.

Also, the film has a new compound that makes the resist material very durable in the engrave stage. Specifically, the compound is formed by adding small air pockets or balls, referred to as microspheres, into the photoresist of the film. These small balls of air create a bounce back effect, analogous to sand hitting and bouncing off a tennis ball or a trampoline, allowing for a stronger resist material without making the material thicker. In the past, the deeper a user wanted to engrave, the thicker the resist had to be. With this new compound it has been experimentally found that a thinner film can be used due to the bounce back of the microspheres. A thinner film allows for more detailed images to be engraved and a stronger film allows for deeper images to be engraved into the surface.

FIG. 1 illustrates a side view of a five layer photoresist film 100 according to an embodiment of the invention. The film 100 comprises a silicon layer 105, an adhesive layer 110, a membrane layer 115, a photoresist layer 120, and a membrane layer 125. The film 100 is configured to have areas where at least the photoresist layer 120 is removed (i.e., a design cutout portion), in the shape of the desired design, such that the engraving process can engrave an object which the film 100 is attached to.

The silicon layer 105, which may also referred to as layer 1, is coated onto polyester/polypropylene or an equivalent release liner. The silicon layer 105 is configured to be peeled away from the remaining layers prior to placing the remaining layers on an object. The silicon layer 105 may also be referred to as the substrate or as a release liner. The details of the silicon layer are known by those with skill in the art. In one embodiment, the silicon layer 105 comprises a polyester film having a thickness of between 2 mil to 10 mils. In another embodiment, polypropylene or other substrates that are capable of being coated on, may be substituted for the polyester film.

The adhesive layer 110, which may also referred to as layer 2, is a novel way to provide attachment to an object, and provides a much easier engraving process by allowing the user to easily move, remove, and reattach the film 100 before applying pressure and before engraving. The adhesive layer includes a pressure sensitive adhesive, such as polyvinyl acetate (sometimes referred to as PVA or wood glue) with applied thickness ranges from 4 microns to 10 microns. The adhesive layer is what sticks the stencil/mask to the object to be engraved. The adhesive layer 110 is described further with respect to FIG. 3.

The membrane layer 115, which may also referred to as layer 3, is a water resistant membrane. The purpose of membrane 115 is to protect the adhesive layer 110 and hold the mask together during the engraving application process. This membrane layer is made of polyurethane, an acrylic, or another water dispersible product that after dries creates a water barrier insoluble to water thickness of membrane ranges 0.05 mils to 1 mil.

The photoresist layer 120, which may also referred to as layer 4 or the film layer, blocks the engraving blast. The photoresist layer 120 comprises a photo-resist material (UV sensitive) which is soluble or dispersible in water but which will harden upon exposure to a UV source. The photoresist layer 120 will cure exposed areas making them insoluble to water. The photoresist layer 120 could be a normal silk-screen emulsion or any other light sensitive emulsion. The photoresist layer 120, along with the microspheres comprising small balls of air which strengthen the photoresist layer and make the film 100 stronger, is described further with respect to FIG. 4.

The top coat layer 125, which may also referred to as layer 5, is described in U.S. Pat. No. RE 38,114 issued to Rayzist, incorporated herein by reference. In this reissue patent, the top coat layer is described as being designed to keep artwork from sticking to surface during an ultraviolet (UV) curing operation.

Figure 2:
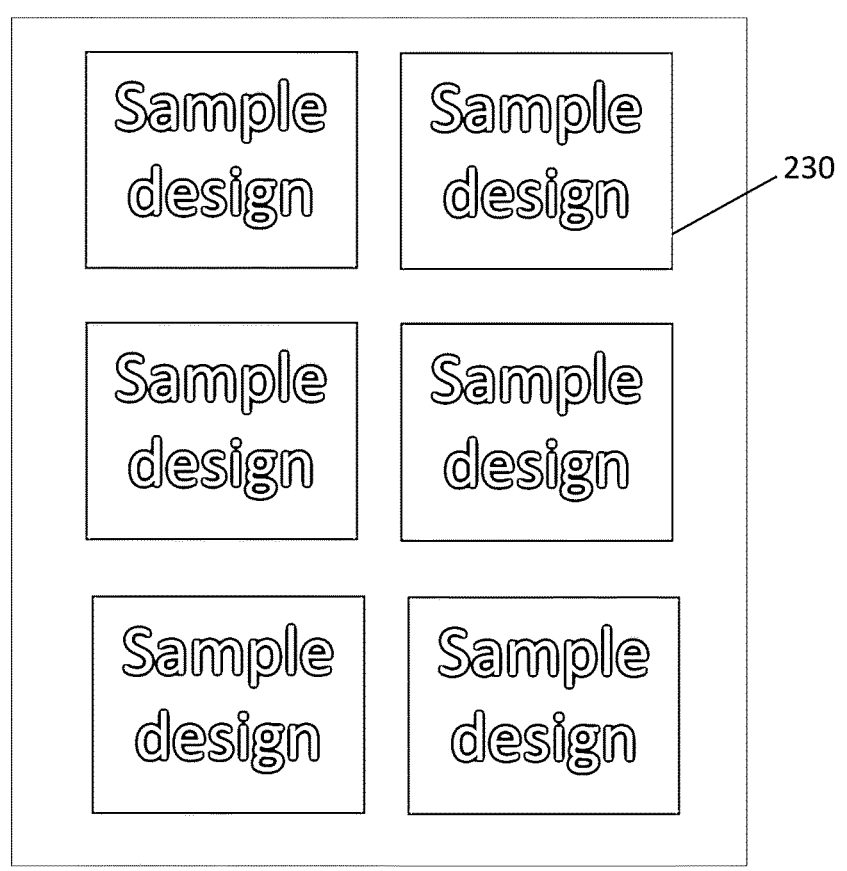
FIG. 2 illustrates a top view of the film according to an embodiment of the invention.

FIG. 2 illustrates a top view of the film 100 according to an embodiment of the invention. The film 100 illustrates six masks 230. The masks 230 (also known as a stencil or a photoresist stencil) are configured to be peeled away from the substrate 105, and then be placed onto an object or another substrate. In one embodiment, the mask 230 is be defined as the bottom four layers of the film 100, without the silicon layer 105, and comprising one portion of the film 100 such that multiple masks 230 can be included on one film. With the silicon layer 105 peeled away, the adhesive layer 110 of the mask 230 can be placed directly on an object.

The masks 230 have a design cutout portion (e.g., "sample design" as illustrated in FIG. 2) representing the design which will be engraved into the object. The non-cutout portion is configured to block the engraving, such that the design is engraved therethrough. Although the six illustrated masks 230 state the words "sample design," one with ordinary skill in the art could come up with other designs and have more or less masks per film 100.

Figure 3:
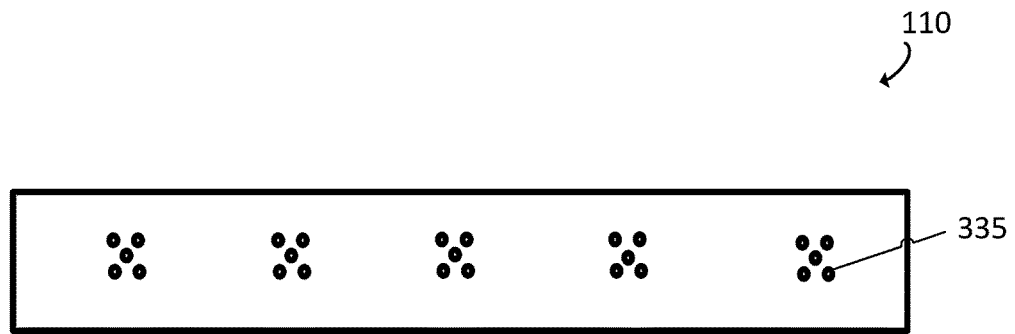
FIG. 3 illustrates an adhesive layer of the film according to an embodiment of the invention.

FIG. 3 illustrates the adhesive layer 110 of the film 100 according to an embodiment of the invention. The adhesive layer 110 includes a pressure sensitive adhesive 335, such as polyvinyl acetate. The adhesive layer 110 is more than just a sticky layer, as it needs to be configured to withstand the blasting process during engraving. Further, the adhesive layer 110 is not simply something that holds together two substrates together, as the adhesive needs to be easily repositionable on an object after the substrate 105 is peeled away. The adhesive layer is repositionable until pressure is applied. After pressure is applied, the adhesive layer is no longer removable.

The adhesive layer 110 allows the end user the ease of repositioning the mask 230 several times while membrane layer holds the film design together. The adhesive layer 110 has a unique property in that it adheres aggressively after pressure is applied, however it releases with ease when necessary to realign to substrate prior to pressure being applied.

In a preferred embodiment, the adhesive layer 110 is designed from Flexcryl SP-38. Flexcryl SP-38 is a water-based adhesive, and is sometimes referred to as a water-based acrylic emulsion adhesive. Flexcryl SP-38 is an all-temperature, coater-ready, water based acrylic pressure sensitive for permanent paper and film applications that require aggressive adhesion at low temperature. Flexcryl SP-38 is designed for use with permanent paper, thermal paper, and clear film labels. Other uses include adhesive applications that require aggressive performance at low temperatures, such as food packaging or price marketing.

Figure 4:
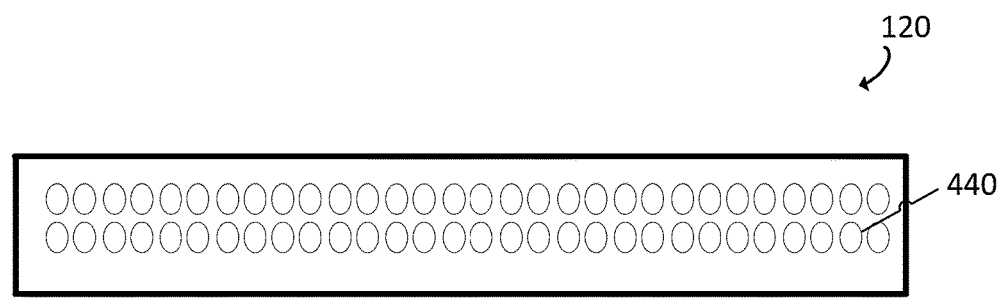
FIG. 4 illustrates a photoresist layer of the film according to an embodiment of the invention.

FIG. 4 illustrates the photoresist layer 120 of the film 100 according to an embodiment of the invention. The photoresist layer 120 includes an added compound that makes this resist material very durable in the engraving stage, by adding small air balls referred to as microspheres 440. These small balls of air (e.g., pockets) create a "bounce" back effect allowing for a stronger resist material without making the material thicker. The microspheres 440 are compressed air balls, like a thousand microscopic rubber balls that work as a bounce back when the blasting hits the surface (as if sand was hitting a tennis ball or a trampoline). The microspheres 440 make the mask 230 stronger. As such, instead of the engraving eating away the photoresist layer 120, the material repels the engraving.

Figure 5:
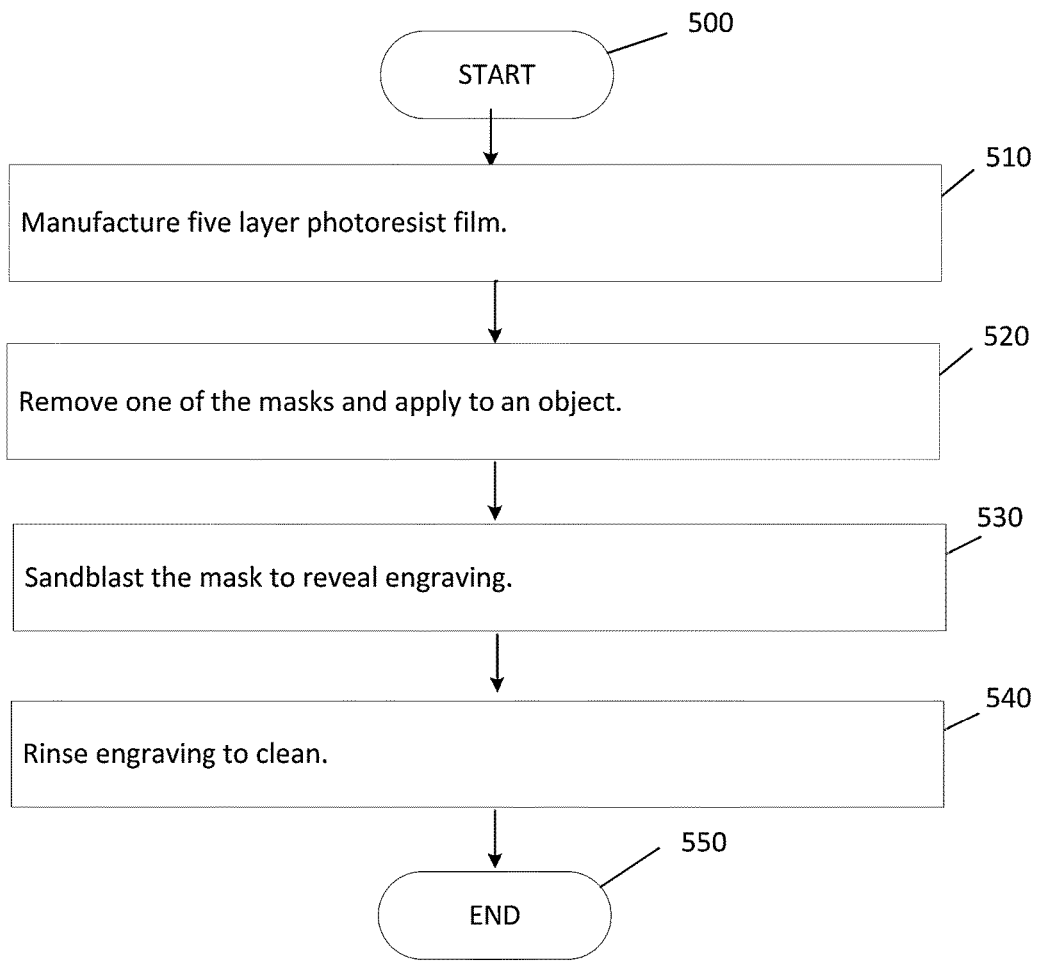
FIG. 5 illustrates the process of engraving an object using the film according to an embodiment of the invention.

FIG. 5 illustrates the process of engraving an object using the film 100 according to an embodiment of the invention. The process starts at step 500. At step 510, the film 100 is manufactured on a substrate 105. The manufacturing process to obtain a layered film is readily apparent to one of ordinary skill in the art. Typically, the film 100 will include several masks 230.

At step 520, one of the masks 230 is peeled from the substrate 105 of the film 100 and applied to an object such as glass. By having the pressure sensitive adhesive 335, the mask 230 can easily be removed, attached, and shifted prior to pressure being applied upon the object, while still being strong enough to not shift during engraving after pressure is applied.

The object, with the mask 230 firmly attached, is then engraved at step 530 to reveal the engraving. Microspheres 440 in the photoresist layer 120 allow the film 100 to be designed thin yet still strong enough repel the engraving. At step 540, the object is rinsed clean with a liquid such as water to reveal a clean engraved object that has been engraved. The process may be repeated recursively a number of times and ends at step 550.

It is to be recognized that depending on the embodiment, certain acts or events of any of the methods described herein can be performed in a different sequence, may be added, merged, or left out altogether (for example, not all described acts or events are necessary for the practice of the method). Moreover, in certain embodiments, acts or events may be performed concurrently, for example, through multi-threaded processing, interrupt processing, or multiple processors, rather than sequentially.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

What is claimed is:

1. A film comprising:
   an adhesive layer of the film comprising a water-based acrylic emulsion adhesive,
   wherein the water-based acrylic emulsion adhesive of the adhesive layer is configured to be attached to a substrate or an object,
   wherein the water-based acrylic emulsion adhesive allows the adhesive layer to be repositioned on the substrate or the object after a release liner or a silicon layer is peeled away from the adhesive layer prior to attaching and engraving, and the adhesive layer is configured to remain fixed to an object after attaching to the adhesive layer and during the engraving;
   a membrane layer of the film attached to the adhesive layer; and
   a photoresist layer of the film attached to the membrane layer, the photoresist layer having a design cutout portion and a non-cutout portion, wherein the non-cutout portion resists the engraving from an engraving blast, wherein the photoresist layer comprises microspheres comprising pockets of air within the non-cutout portion of the photoresist layer,
wherein the microspheres block the engraving from the engraving blast to ensure the non-cutout portion of the photoresist layer blocks areas which should not be engraved and the microspheres within the non-cutout portion of the photoresist layer repel the engraving from the engraving blast by creating a bounce back effect.

2. The film of claim 1, further comprising a top coat layer attached to the photoresist layer.

3. The film of claim 1, wherein the photoresist layer comprises a film.

4. The film of claim 1, wherein the adhesive layer comprises polyvinyl acetate.

5. The film of claim 1, wherein the substrate comprises a silicon layer.

6. A method comprising:
attaching an adhesive layer comprising a water-based acrylic emulsion adhesive, wherein the water-based acrylic emulsion adhesive of the adhesive layer is configured to be attached to a substrate or an object, wherein the water-based acrylic emulsion adhesive allows the adhesive layer to be repositioned on the substrate or the object after a release liner or a silicon layer is peeled away from the adhesive layer prior to attaching and engraving, and the adhesive layer is configured to remain fixed to an object after attaching to the adhesive layer and during the engraving;
attaching a membrane layer to the adhesive layer; and
attaching a photoresist layer to the membrane layer, the photoresist layer having a design cutout portion and a non-cutout portion, wherein the non-cutout portion resists the engraving from an engraving blast, wherein the photoresist layer comprises microspheres comprising pockets of air within the photoresist layer,
wherein the microspheres block the engraving from the engraving blast to ensure the photoresist layer blocks areas which should not be engraved and the microspheres within the photoresist layer repel the engraving from the engraving blast by creating a bounce back effect.

7. The method of claim 6, further comprising a top coat layer attached to the photoresist layer.

8. The method of claim 6, wherein the photoresist layer comprises a film.

9. The method of claim 6, wherein the adhesive layer comprises polyvinyl acetate.

10. The method of claim 6, wherein the substrate comprises a silicon layer.

11. The film of claim 1, wherein the membrane layer holds the film together during the engraving.

* * * * *